Figure 1:
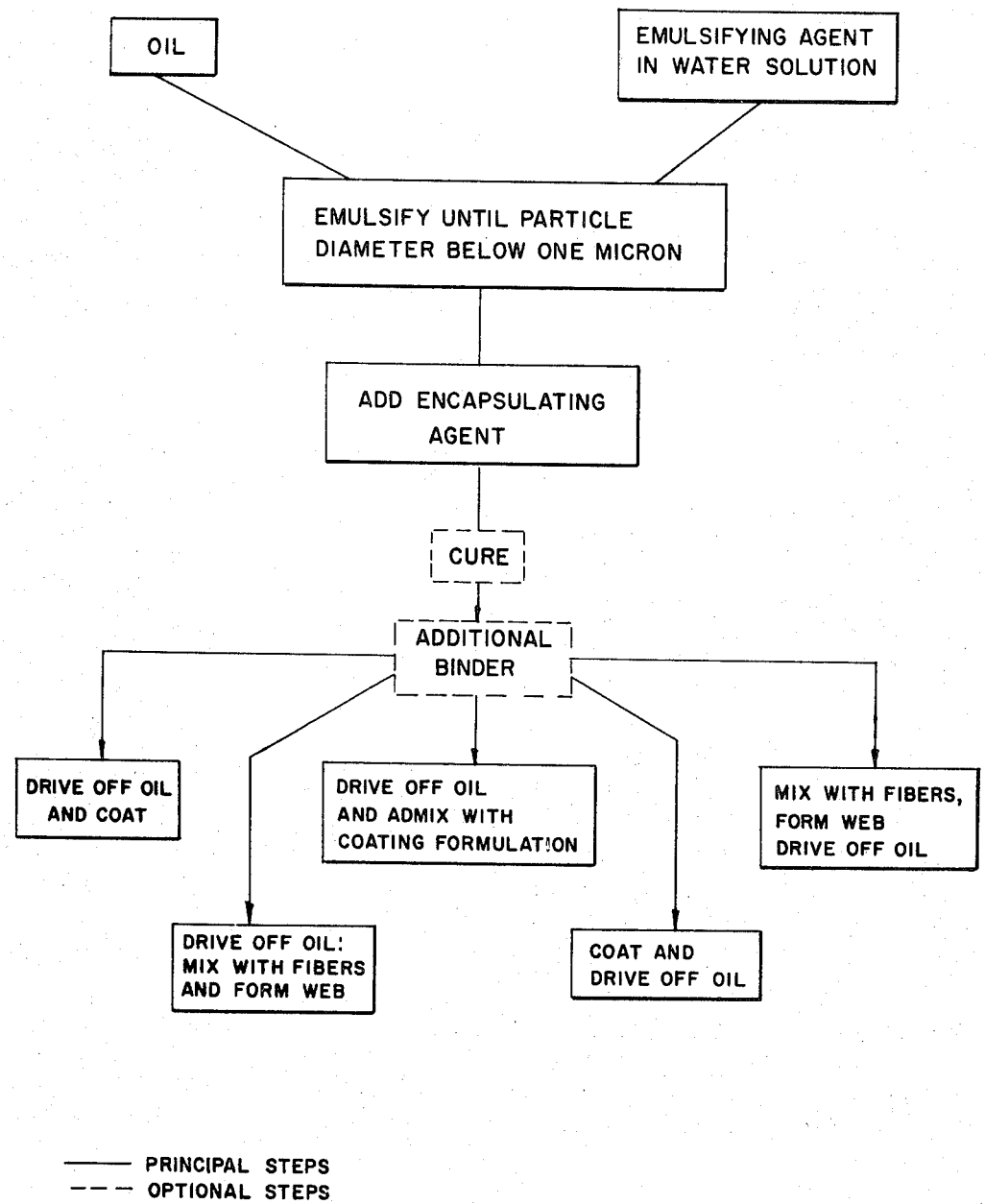

United States Patent [19]
Vassiliades et al.

[11] 3,720,579
[45] March 13, 1973

[54] FIBROUS SUBSTRATES WITH MICROCAPSULAR OPACIFIERS

[75] Inventors: Anthony Vassiliades, Deerfield; Edward F. Nauman, Lake Forest; Shrenik Shroff, Chicago, all of Ill.

[73] Assignee: Champion International Corporation, New York, N.Y.

[22] Filed: March 16, 1971

[21] Appl. No.: 124,986

Related U.S. Application Data

[62] Division of Ser. No. 786,337, Dec. 23, 1968, Pat. No. 3,585,149.

[52] U.S. Cl. ............162/162, 162/164, 162/165, 162/168
[51] Int. Cl. ............................................D21h 3/80
[58] Field of Search ............162/162; 106/300, 312; 117/100, 148, 155; 260/2.5, 41

[56] References Cited

UNITED STATES PATENTS

| | | | |
|---|---|---|---|
| 2,797,201 | 6/1957 | Veatch et al. | 260/2.5 |
| 2,929,106 | 3/1960 | Snow | 264/96 X |
| 3,137,631 | 6/1964 | Soloway | 424/16 X |
| 3,161,468 | 12/1964 | Walsh | 252/449 X |
| 3,330,784 | 7/1967 | Anspon | 260/2.5 |
| 3,418,656 | 12/1968 | Vassiliades | 252/316 |
| 3,516,941 | 6/1970 | Matson | 252/316 |
| 3,585,149 | 6/1971 | Vassiliades et al. | 162/162 |

*Primary Examiner*—S. Leon Bashore
*Assistant Examiner*—Richard H. Tushin
*Attorney*—David S. Abrams, Robert H. Berdo, Walter C. Farley, Donald A. Kaul and Donald C. Roylance

[57] ABSTRACT

Opacifiers comprising air-containing microcapsules having an average particle diameter of below about 1 micron provide highly opaque surfaces when coated onto and/or incorporated into fibrous and non-fibrous substrates. The opacifiers are produced by heating liquid-containing precursor microcapsules at temperatures sufficient to expel the liquid and provide air in the microcapsule.

6 Claims, 10 Drawing Figures

——— PRINCIPAL STEPS
– – – ALTERNATE STEPS

FIBROUS SUBSTRATES WITH MICROCAPSULAR OPACIFIERS

CROSS REFERENCE TO RELATED APPLICATIONS

This application is a division of our copending application Ser. No. 786,337, filed Dec. 23, 1968, now U.S. Pat. No. 3,585,149, for MICROCAPSULAR OPACIFIER SYSTEM.

This application contains subject matter common to the following prior copending applications: U.S. Pat. Application Ser. No. 503,391 filed Oct. 23, 1965 now U.S. Pat. No. 3,418,656; U.S. Pat. application Ser. No. 503,966 filed Oct. 23, 1965 now U.S. Pat. No. 3,418,250; and U.S. application Ser. No. 583,046 filed Sept. 29, 1966 now abandoned.

FIELD OF THE INVENTION

This invention relates to a method for providing high opacity in fibrous and non-fibrous substrates, surface finishes and to the substrates produced by such method. More specifically, this invention relates to microcapsular opacifiers, their production, and the use of such opacifiers in coatings, substrates and the like.

DESCRIPTION OF THE PRIOR ART

The development of fibrous and non-fibrous systems having a high opacity has always been a great concern to paper manufacturers and paint manufacturers.

The degree of opacity of a particular substrate is the result of diffuse light-scattering which occurs when visible radiation is reflected from particles on the surface of the substrate and in the substrate medium itself. It has been conventional to employ coatings of high density inorganic fillers, such as titanium dioxide, calcium carbonate and certain clays, to enhance the opacity of various substrates. However, the employment of such fillers has many disadvantages in the production of paper, for example.

Generally, the use of such inorganic opacifying materials greatly increases the weight of the paper. This increase in weight is not consistent with the increasing market demands for producing a lighter-weight paper having high opacity.

Also, the incorporation of large amounts of fillers in paper results in a substantial loss of the paper web strength. In addition, the generally low retention of the inorganic opacifiers in the paper results in a substantial monetary loss by virtue of the high by-product waste material thereby resulting. More importantly, this results in heavy contamination of streams and other waterways. In addition to the foregoing disadvantages in the employment of such inorganic filler materials in paper, most inorganic fillers possess a low opacity-to-weight ratio when incorporated in paper and other thin substrates.

It is therefore, an object of this invention to provide a means for increasing the opacity of fibrous and non-fibrous substrates without significantly increasing the weight of said substrates, and at the same time avoiding all the aforementioned disadvantages of the inorganic opacifying materials.

It is another object of this invention to substantially improve the optical properties, e.g., opacity and brightness, of fibrous substrates without decreasing the web strength of such substrate.

Another object of the present invention is to provide fibrous and non-fibrous substrates having an increased opacity and brightness without a substantial attendant increase in weight.

Still another object of the present invention is to provide opacifiers which possess a high opacity-to-weight ratio when incorporated into coatings, on fibrous and in non-fibrous substrates.

Still another object of the present invention is to provide a method for the production of the light weight opacifiers possessing a high opacity-to-weight ratio.

SUMMARY OF THE INVENTION

These and other objects and features of the present invention are achieved by providing air-containing microcapsules having an average particle size below about one micron, which microcapsules when incorporated into coatings, on fibrous substrates and into non-fibrous substrates greatly increase the opacity of such substrates without substantially increasing the weight thereof.

For about the last ten years, microcapsules containing both liquid and solid nucleus materials have found acceptance in a variety of commercial applications. For example, one of the most widespread uses of microcapsules have been in the art of transfer-copy systems. Other recent applications in which the microcapsules have been used extensively are in adhesives and adhesive tapes, fertilizers, pharmaceuticals, foods and cosmetics.

It has now been found that microcapsular opacifiers may be produced which contain an encapsulated medium or core material which consists essentially of air. Surprisingly, when the present air-containing microcapsules are coated onto and/or incorporated into a substrate, such as paper, glass, film, metal, wood, etc., or incorporated into surface finishes such as paints, they significantly increase the opacity of the substrate by scattering back substantial amounts of the incident light which would otherwise be transmitted by the substrate. Furthermore, it has been found that when air-containing microcapsules having an average diameter of less then about one micron, e.g., between about 0.1 and about 1.0 micron, preferably between about 0.25 and 0.8 micron, are incorporated into and onto various substrates, high opacities result which were heretofore unobtainable with similar amounts of inorganic opacifiers. Since the present air-containing microcapsules are relatively light in weight, the incorporation of such microcapsules into a fibrous cellulosic substrate, for example, will induce a high opacity for the substrate without greatly increasing the weight of said substrate. Also, the opacifiers of the present invention provide many advantages over those conventionally employed, e.g., inorganic oxides. If desired, the present opacifiers may be employed in combination with such inorganic opacifiers as titanium dioxide and the like to enhance the opacifying efficiency.

The microcapsular opacifiers of the present invention comprise discrete, essentially spherical, air-containing microcapsules having substantially continuous, solid walls and have an average particle diameter below about one micron.

The term "substantially continuous solid walls" as employed herein is intended to include solid-walled microcapsules which are still sufficiently porous to permit the escape of a core material in gaseous form therethrough upon the application of heat. The core material passes through the micropores of the capsule and is replaced therein with air. The core materials that may be employed in the production of the present air-containing microcapsules are more particularly defined hereinafter.

The air-containing microcapsular opacifiers of the present invention may be produced by a method which comprises providing discrete, essentially spherical precursor microcapsules having substantially continuous walls, said microcapsules having an average particle diameter of below about one micron and containing a core material, such as a water-immiscible oily material selected from the group consisting of liquid and low melting oils, fats, and waxes, or a water-miscible liquid, such as, low molecular weight alcohols, ketones, etc., and heating the microcapsules to a temperature sufficient to substantially completely drive-off the water-immiscible oily core material from the microcapsules.

The precursor microcapsules of the present invention may be provided in any suitable manner, so long as the walls of the capsules have sufficient structural integrity to permit the core material to pass therethrough when heated without being ruptured or deformed into a substantially non-spherical shape. According to one aspect of the present invention, precursor microcapsules are provided that have solid walls of a hydrophobic resin and contain minute droplets of an oil-in-water emulsion.

According to another aspect of the present invention, solid-walled, precursor microcapsules containing a water-immiscible oily material may be provided by adding a cross-linking or complexing agent to a colloidal solution of one or more emulsifying agents, wherein the emulsifying agents possess groups capable of reacting with a cross-linking or complexing agent.

In the past, the production of microcapsules has involved, to a large extent, a phenomenon referred to as "coacervation."d Coacervation is the term applied to the ability of a number of aqueous solutions of colloids to separate into two liquid layers, one rich in colloid solute and the other poor in colloid solute. Factors which influence this liquid-liquid phase separation are: (a) the colloid concentration, (b) the solvent of the system, (c) the temperature, (d) the addition of another polyelectrolyte, and (e) the addition of a simple electrolyte to the solution.

A unique property of coacervation systems is the fact that the solvent components of the two phases are the same chemical species. This is a major distinguishing characteristic of coacervates as compared to two phase systems involving two immiscible liquids. Thus, a colloidal solute particle migrating across the interface of a two-phase coacervate system finds itself in essentially the same environment on either side of the interface. From the viewpoint of composition, the difference between the two phases is a difference in concentration of solute species. Structurally, the two phases differ in that the colloidal solute of the colloid-poor phase is randomly oriented and the colloidal solute of the coacervate or colloid-rich phase shows a great deal of order. In all cases where coacervation has been observed, the solute species are geometrically anisotropic particles.

Coacervation can be of two general types. The first is called "simple" or "salt" coacervation where liquid phase separation occurs by the addition of a simple electrolyte to a colloidal solution. The second is termed "complex" coacervation where phase separation occurs by the addition of a second colloidal species to a first colloidal solution, the particles of the two dispersed colloids being oppositely charged. Generally, materials capable of exhibiting an electric charge in solution (i.e. materials which possess an ionizable group) are coacervatable. Such materials include natural and synthetic macromolecular species such as gelatin, acacia, tragacanth, styrene-maleic anhydride copolymers, methyl vinyl ether-maleic anhydride copolymers, polymethacrylic acid, and the like.

With both simple and complex coacervate systems, a necessary precondition for coacervation is the reduction of the charge density of the colloidal species. In the case of simple coacervation, this reduction of the charge density along with partial desolvation of the colloidal species is similar to that preceding the flocculation or precipitation of a colloid with the addition of a simple electrolyte since it is known that the addition of more electrolyte to a simple coacervate leads to a shrinking of the colloid-rich layer and the subsequent precipitation of the colloidal species. This same reduction of charge density along with partial desolvation of the colloidal species which precedes the precipitation of two oppositely charged colloids from solution may also be regarded to be the cause for the phase separation in a complex coacervate system. However, while the reduction of the charge density is a necessary precondition for coacervation, it is oftentimes not sufficient for coacervation. In other words, the reduction of the charge density on the colloidal particles must alter or modify the solute-solute interactions to such an extent that the colloidal particles will tend to aggregate and form a distinct, continuous liquid phase rather than a flocculant or a solid phase. This tendency is attributable to both coulombic and long-range Van der Waal's interactions of large aggregates in solution. Thus, in both "simple" and "complex" coacervation, two-solution phase formation begins with the colloidal species aggregating to form submicroscopic clusters; these clusters coalesce to form microscopic droplets. Further coalescense produces macroscopic droplets which tend to separate into a continuous phase. This phase appears as a top or bottom layer depending upon the relative density of the two layers.

If, prior to the initiation of coacervation, a water-immiscible material, such as an oil, is dispersed as minute droplets in an aqueous solution or sol of an encapsulating colloidal material, and then, a simple electrolyte, such as sodium sulfate, or another, oppositely charged colloidal species is added to induce coacervation, the encapsulating colloidal material forms around each oil droplet, thus investing each of said droplets in a liquid coating of the coacervated colloid. The liquid coatings which surround the oil droplets must thereafter by hardened to produce solid-walled microcapsules.

Coacervation encapsulation techniques require critical control over the concentrations of the colloidal material and the coacervation initiator. That is, coacervation will occur only within a limited range of pH, colloid concentration and/or electrolyte concentration.

For example, in simple coacervation, if a deficiency of the electrolyte is added, two-phase formation will not occur whereas, if an excess is added, the colloid will precipitate as a lumpy mass. With complex coacervation systems using a colloid having an iso-electric point, pH is especially important since the pH must be adjusted and maintained at a point where both colloids have opposite charges. In addition, when a gelable colloid, such as gelatin, is used as the encapsulating material, coacervation must take place at a temperature above the gel point of the colloid.

Accordingly, it is preferred to provide precursor microcapsules in the production of the air-containing opacifiers of the present invention, by a process which is devoid of the coacervation phenomenon and the difficulties inherent therewith. The preferred processes for providing the precursor microcapsules do not require strict control of the pH of the system, the electrical charge on a colloidal species to permit formation of microcapsules, a particular electrolytic concentration or a coacervating agent. However, precursor oil-containing microcapsules produced by the technique known as "coacervation" can be employed for the production of the opacifiers of the present invention, if desired. Additionally, any microencapsulation method, whether chemical or physical, that is capable of yielding air-containing microcapsules having an average diameter below about one micron may be employed.

According to one aspect of the present invention, precursor microcapsules are provided which have solid walls of a hydrophobic resin and contain minute droplets of an oil-in-water emulsion. The process for providing such microcapsules may be described briefly as a simple admixing of at least four ingredients. These ingredients are:

A. a water-immiscible oily material selected from the group consisting of liquid and low melting oils, fats, and waxes;
B. an amphiphilic emulsifying agent;
C. at least one solution comprising a polymeric resin, said solution selected from the group consisting of;
  1. solutions comprising a hydrophobic, thermoplastic resin as the solute, said resin not having appreciable solubility in the oily material, and a water-and oil-miscible organic liquid as the solvent, said thermoplastic resin being capable of being separated in solid particle form from solution upon dilution with water,
  2. solutions comprising a partially condensed thermosetting resin as the solute and water as the solvent, said resin condensate being capable of being separated in solid particle form from solution upon dilution with water, and
  3. mixtures of (1) and (2); and,
D. water in a quantity sufficient to cause the separation of at least one of said polymeric resins from solution.

The sequence of said admixing must be such that encapsulation of the emulsion by at least one of the synthetic resins in the admixture by dilution and ultimate separation from solution in solid particle form about a nucleus of oil in water upon dilution with water occurs no sooner than simultaneously with the formation of the emulsion. In other words, dilution, which can be performed by the addition of water to the oil-emulsifier-resin solution admixture or by the addition of the resin solution to the water-oil-emulsifier admixture, must be the final operation of the process. Thus, in the first case, the emulsifying operation and the encapsulation operation can be considered to take place simultaneously, whereas, in the second case, the emulsion is already formed when it is admixed with the resin solution.

As previously mentioned, the core material, e.g., a water-immiscible oily material, in the precursor microcapsules is driven from the microcapsules and is replaced by air. By "water-immiscible oily materials", as employed herein, is meant lipophilic materials which are preferably liquid, such as oils, which will not mix with water and which can be driven through the porous, solid walls of the particular precursor microcapsules employed. The discrete microcapsules of the present invention may be provided with low melting fats and waxes as the lipophilic material. However, oils are the preferred core material, since they do not require special temperature maintenance during the production of the microcapsules. Furthermore, oils are more easily volatilized and driven through the micropores of the walls of the microcapsules by the application of heat.

In general, the lipophilic nucleus materials may be natural or synthetic oils, fats, and waxes or any combination thereof which can be removed from the microcapsules at the desired temperatures. Among the materials that can be employed in the process of the present invention are: mineral spirits, natural oils, such as castor oil, soyabean oil, petroleum lubricating oils, fish liver oils, and essential oils, such as methyl salicylate and halogenated biphenyls; low melting fats and waxes.

The preferred lipophilic material for employment in the present invention are those oils having a fairly high vapor pressure (high volatility), so that it can be completely and easily expelled through the micropores of the solid-walled microcapsules by the application of moderate amounts of heat. It is especially preferred to employ oils which can be driven from the microcapsules at temperatures conventionally employed in the drying of paper webs or paper coatings, e.g., about 85°C. Preferred oils for use in the present invention include mineral spirits, chlorinated biphenyls, toluene, styrene, turpentine, and oils having a like volatility.

The emulsifying agents which may be used in the formation of the microcapsules are "amphiphilic." That is, while the emulsifiers are generally preferentially soluble in one phase of the emulsion, they do possess an appreciable affinity for the other phase. It can be said, then, that an amphiphilic emulsifier gives oil a more hydrophilic nature than it had before, and, conversely, gives water a more lipophilic nature. Exemplary of the amphiphilic emulsifying agents which can be used in the instant invention are: naturally-occurring, lyophilic colloids including gums, proteins and polysaccharides, such as, gum arabic, gum tragacanth, agar, gelatin and starch; and synthetic materials such as, hydroxyethyl cellulose, methyl cellulose, polyvinyl pyrrolidone, and copolymers of methyl vinyl ether and maleic anhydride.

The thermoplastic resins which may function as the encapsulating materials must be of a hydrophobic nature. In other words, they should not be capable of dissolving readily in water. While it is true that all resins exhibit some, even though very small hydrophilic properties, those resins acceptable for use in this aspect of the invention must for the most part be hydrophobic, that is, more lipophilic than hydrophilic.

In general, the thermoplastic resins are to be macromolecular polymers, copolymers, block polymers, and the like. The preferred resins are those containing non-ionizable groups, since the extent to which a resin ionizes has an ultimate effect on the resin's hydrophilic-hydrophobic properties. Resins such as polyvinyl chloride and polystyrene are non-ionizable and are, therefore, preferred. However, other resins which can be used are polyvinyl acetate, vinyl chloride-vinylidene chloride copolymers, cellulose acetate and ethyl cellulose. Novolak resins which are linear, thermoplastic condensation products of phenol and formaldehyde, are also capable of being used in the present invention as the thermoplastic resin. The novolaks are permanently fusible and soluble as long as their molecular structure is linear.

The selection of solvents for the resin to be used will depend on the specific encapsulating thermoplastic resin and the oil employed. Furthermore, the solvent must be sufficiently miscible with water in order for the resin to be separated from its solution when the oil-resin mixture is admixed with water.

In general, the solvents which are preferable are organic and of low polarity. Tetrahydrofuran has been used successfully with all the resins heretofore mentioned and is, therefore, preferred. Examples of other solvents which are suitable include dioxane, cyclohexanone, methyl tetrahydrofuran, methyl isobutyl ketone and acetone.

A small amount of stabilizer may be incorporated with the solution of the thermoplastic resin to increase the resins stability towards heat, light and atmospheric oxygen. Examples of stabilizers which may be used include dibasic lead phosphite, dibasic lead stearate, tribasic lead sulfate monohydrate, dibutyltin maleate and others well known to the art. The use of such stabilizers is wholly conventional.

The partially condensed thermosetting resins which may be used in various embodiments of this invention must also be of a hydrophobic nature in their solid, infusible state. These resins comprise that broad class of compositions defined as formaldehyde condensation products and include condensation reaction products of formaldehyde with phenols, such as, hydroxybenzene (phenol), m-cresol and 3,5-xylenol; carbamides, such as, urea; triazines, such as, melamine; amino and amido compounds, such as, aniline, p-toluenesulfonamide, ethyleneurea and guanidine; ketones, such as, acetone and cyclohexanone; aromatic hydrocarbons, such as, naphthalene; and heterocyclic compounds, such as, thiophene. Under the influence of heat, these resins change irreversibly from a fusible and/or soluble material into an infusible and insoluble material.

The preferred formaldehyde condensation products employed in this invention are partially-condensed melamine-formaldehyde, phenol-formaldehyde and urea-formaldehyde resins. These partially condensed resins can be prepared easily according to conventional practices. For example, a melamine-formaldehyde partial condensate or syrup, which was used in a number of the examples enumerated below, is prepared by refluxing 125 grams of melamine in 184 milliliters of formalin (37 percent by weight formaldehyde) neutralized to a pH of 8 with sodium carbonate. The mole ratio of formaldehyde to melamine in this reaction mixture is 2.3 to 1. The reaction continues for about 1 to 1 ½ hours at a temperature between 92° and 96°C. or until 1 volume of the condensate becomes turbid when diluted with 2 to 10 volumes of water. The condensate can be used immediately or can be stored for later use by adding a small amount, about 6 to 15 percent by weight, of methanol to the condensate. The methanol prevents any further rapid condensation of the resin solution upon standing and can be evaporated from the syrup either prior to or during the admixing operation. The resinous condensate or syrup, either with or without methanol, defines an aqueous solution of a partially-condensed, highly cross-linkable resin, said solution being capable of being diluted up to at least twice its volume before any appreciable separation of the resin from its solution occurs. After separation of the resin from its solution, the condensation reaction continues with time to effect additional cross-linking of the partially condensed materials. This additional condensation or cross-linking may be accelerated by the application of heat to the precipitated particles. Thus, microcapsules comprising walls of a thermosetting resin material become harder with the passage of time.

Preferably, a small amount of a stabilizer is added to the thermosetting resin syrup in order to improve the stability of the resin towards heat, light and oxygen. For example, from about 0.3 to 0.5 percent by weight of a conventional stabilizer such as zinc stearate or dibasic lead stearate may be used.

The dilution of either one or both of the resin solutions should take place as the final operation of the process, which dilution takes place slowly and under conditions of brisk agitation. In other words, the sequence of admixing the ingredients may generally proceed in any order so long as the separation or precipitation of a resin from solution results in the encapsulation of emulsion droplets. Thus, when a single resin is to be used, the order of additions must be such that either water or the resin solution is the last addition. Microcapsules may be provided which contain a dispersion comprising one or more emulsion-containing microcapsules. Thus, once an oil-in-water emulsion is encapsulated, a second dilution operation may be effected by simply adding another resin solution to the aqueous dispersion of the first-formed microcapsules. Consequently, microcapsules containing microcapsules are produced.

Brisk agitation is required in order to obtain very small droplets of the emulsion, and, ultimately, very small capsules. Thus, microcapsules having diameters ranging from below about 1 micron and preferably between about 0.25 and about 0.8 micron may be produced according to the practices of this invention. Agitation may be achieved by means of a high speed mixer or impeller, by ultrasonic waves or by other conventional means. Brisk agitation need be maintained only in the zone of admixing and not throughout the entire volume of the liquid to which the outer liquid is being added. Agitation should be conducted in a manner such that the emulsion droplets have an average diameter between about 0.25 and about 0.5 micron prior to encapsulation, so that upon completion of encapsulation the average final particle diameter does not exceed 0.8 to about 1.0 micron.

The slower the speed of admixing, the more impermeable the capsule walls will be to both internal and external leakage. Slow admixture may be achieved by any of the conventional means, such as by spraying in the form of a fine mist or by dripping.

Regardless of the manner of providing the oil-containing precursor microcapsules employed, the microcapsules are heated to temperatures which cause the oily material to volatilize and pass through the micropores in the solid walls of the microcapsules. The heating of the microcapsules may take place at any time subsequent to their formation. In the case of microcapsular opacifiers to be used on fibrous substrates, the oily material may be driven from the microcapsules either before or subsequent to their being coated onto the substrate. For example, a dispersion of the oil-containing microcapsules may be spray-dried so as to provide air-containing microcapsules, which may be then coated onto the substrate.

As previously mentioned, the precursor microcapsules may contain a water-miscible core material. For example, if the oily material is driven from the suspended microcapsules prior to their being coated onto or incorporated into a substrate or a surface finish, the oily material may be replaced by another liquid such as water or whatever other liquid may constitute the medium in which the microcapsules are suspended. Likewise, a dispersion of the microcapsules having a water-miscible core material may be spray-dried to provide the air-containing microcapsules of the present invention.

FIG. 1 illustrates the various alternative modes of producing a web material coated with the air-containing microcapsules of the present invention.

In the encapsulating process shown in FIG. 1, the core is exemplified by an oily material, such as a chlorinated biphenyl which is admixed with an aqueous solution of an emulsifying agent, e.g., methyl cellulose, and agitation is continued until emulsion droplets having an average diameter less than one micron are produced. Next, an aqueous solution of an encapsulating agent, e.g., urea formaldehyde is added to the emulsion with brisk agitation and solid-walled microcapsules are immediately formed. The microcapsules may be optionally cured, e.g., by the addition of glyoxal, and then any one of four procedures may be followed. Thus, the microcapsular dispersion may be heated to a temperature of, for example, between about 80° and about 100°C. to drive off the oily material through the micropores of the capsule walls and then the air-containing microcapsules may be coated onto the web and dried. Any suitable temperatures may be employed to drive the oily material from the microcapsules, so long as the microcapsules are not destroyed.

Alternatively, the microcapsules may be heated while in dispersion to drive off the oil and subsequently cellulose fibers may be added to the dispersion. The resulting admixture of the air-containing opacifiers and fibers may be formed into a web and dried.

Still another alternative is to coat the oil-containing microcapsules onto a fibrous web and then heat the microcapsules to drive the oil therefrom.

In the case of surface finishes, such as paints, the core material may be driven from the microcapsules either prior or subsequent to their incorporation into the paint as opacifiers.

Figure 2:
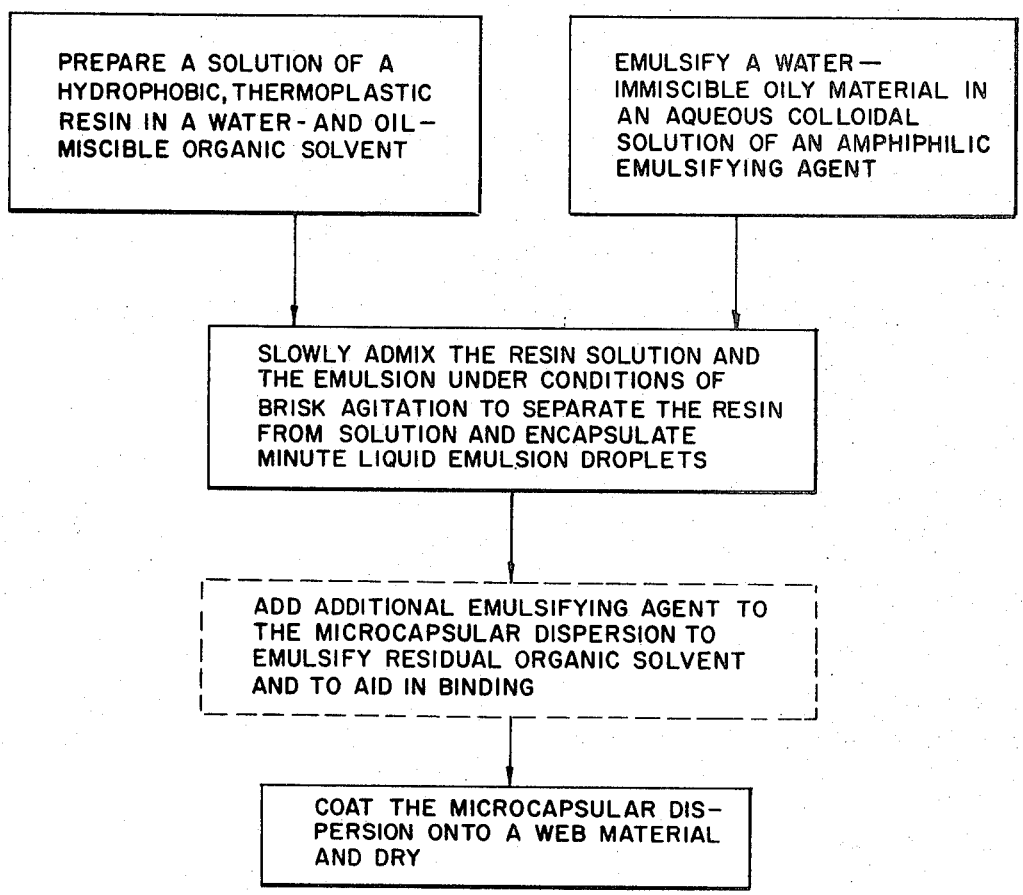

FIG. 2 shows a process by which an oil-in-water emulsion is encapsulated by a thermoplastic resin. The resin, in the form of a solution, is admixed slowly with the emulsion. However, the admixture may involve the addition of the emulsion to the resin solution. In either case, the thermoplastic resin separates from its original solution as minute, solid-walled particles by reason of the dilution of the resin solution by the water of the emulsion. Each of the solid-walled particles may contain one or more oil-in-water emulsion droplets. It should be noted that the resin should not have appreciable solubility in the core material.

On completion of the dilution operation, the admixture constitutes the minute resin particles (each containing droplets of the emulsion) evenly dispersed in an aqueous medium comprising water, the solvent for the resin and residual emulsifying agent. Essentially all of the oily material (in emulsion form) is contained within the resin particles. The thus-formed microcapsular dispersion may be heated to drive off the oil or may be coated directly onto a web material and heated to produce a coating of opacifiers. As an optional step, a small amount of a binder material may be added to the microcapsular dispersion prior to coating. Such addition aids in binding the microcapsules to the web material.

Figure 3:
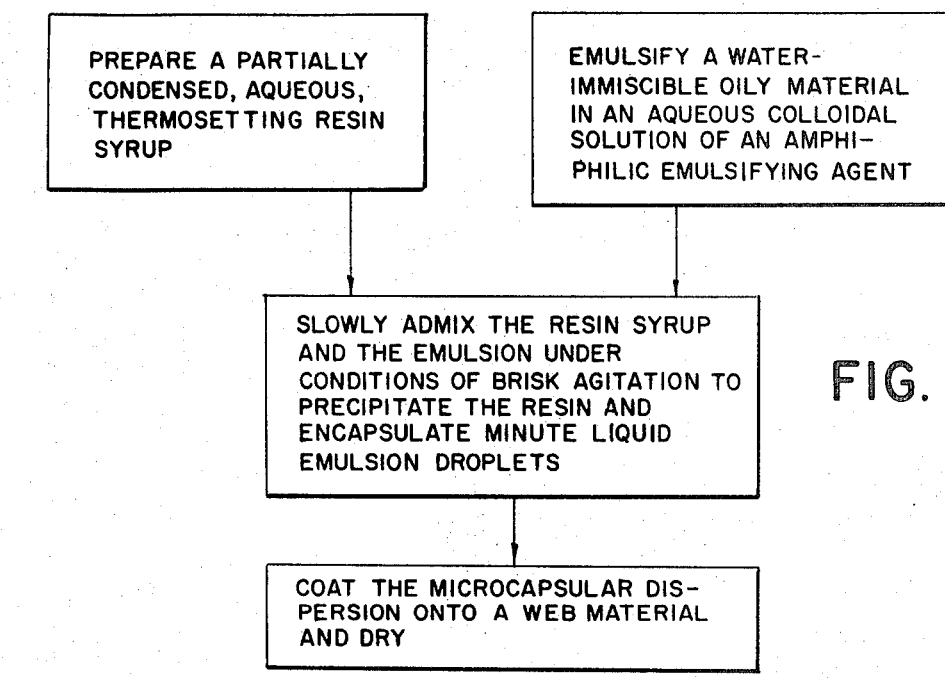
Figure 4:
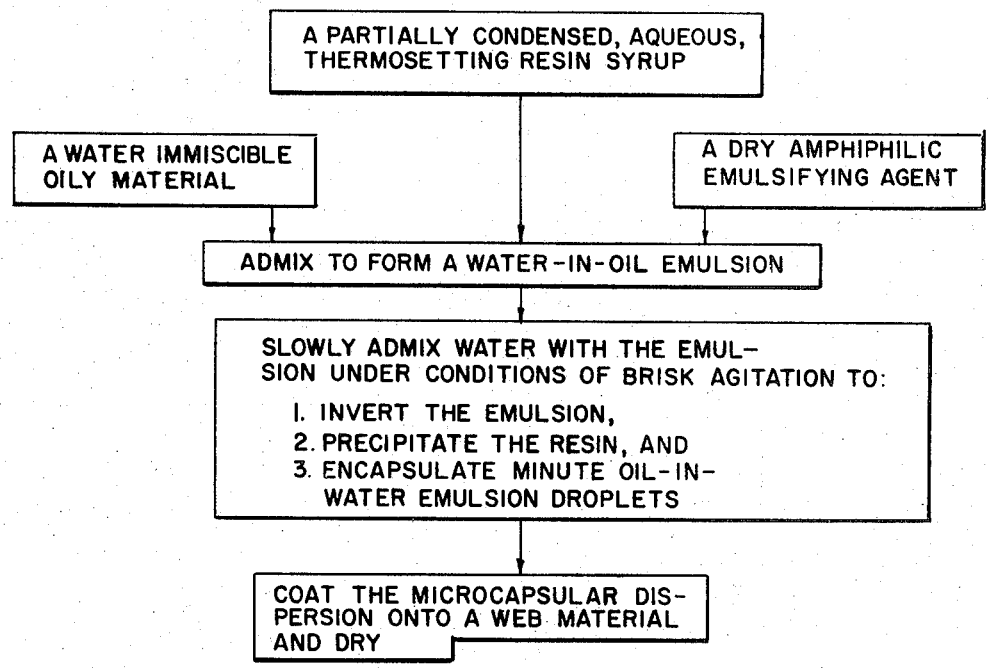

FIGS. 3 and 4 show two alternative processes of the microencapsulation of an oil-in-water emulsion with a thermosetting resin. In FIG. 3, the process shown is substantially the same as that shown in FIG. 2 with the exception that a partially condensed, aqueous, thermosetting resin syrup is substituted for the thermoplastic resin solution. Although not shown in FIG. 3, the optional step of adding a binder material to the microcapsular dispersion prior to coating may be performed.

The process as shown in FIG. 4 involves first preparing a water-in-oil emulsion by admixing the oily material with an amphiphilic emulsifying agent and the thermosetting resin syrup. By slowly admixing water with this emulsion, the emulsion will gradually invert to an oil-in-water emulsion. The dilution of the initial emulsion with water simultaneously induces the precipitation of the thermosetting resin, thereby encapsulating the oil-in-water emulsion within the precipitated resin particles. The resulting microcapsules, which are evenly dispersed throughout an aqueous medium containing residual emulsifying agent, may then be coated onto a web material and dried to drive off the oil, or, alternatively, an additional amount of a binder may be admixed with the dispersion prior to coating, such as shown in FIG. 2.

Figure 5:
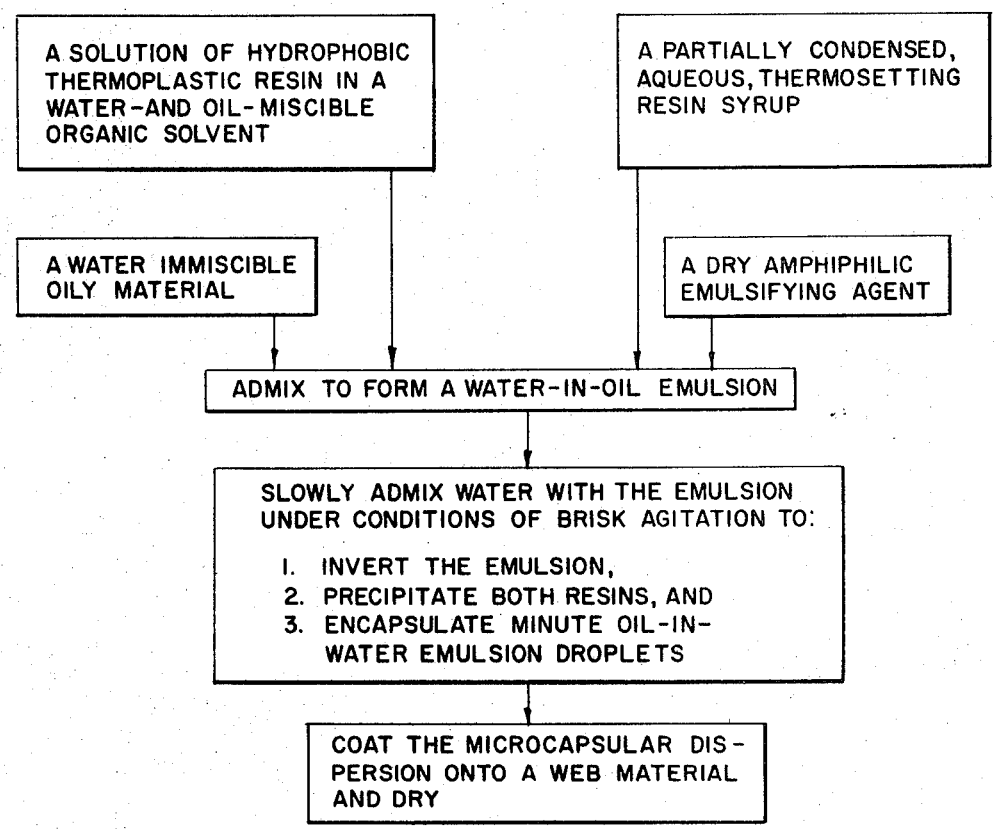
Figure 6:
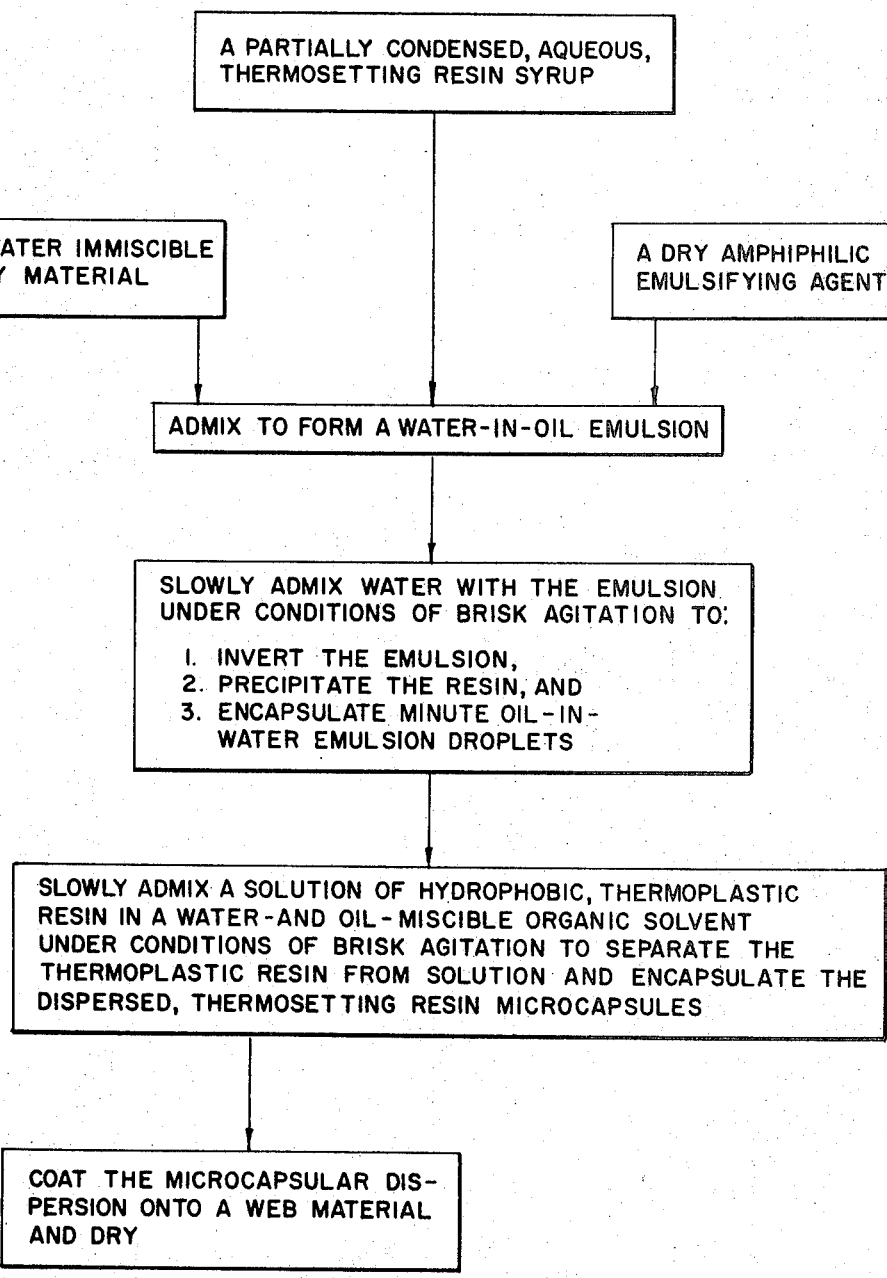
Figure 7:
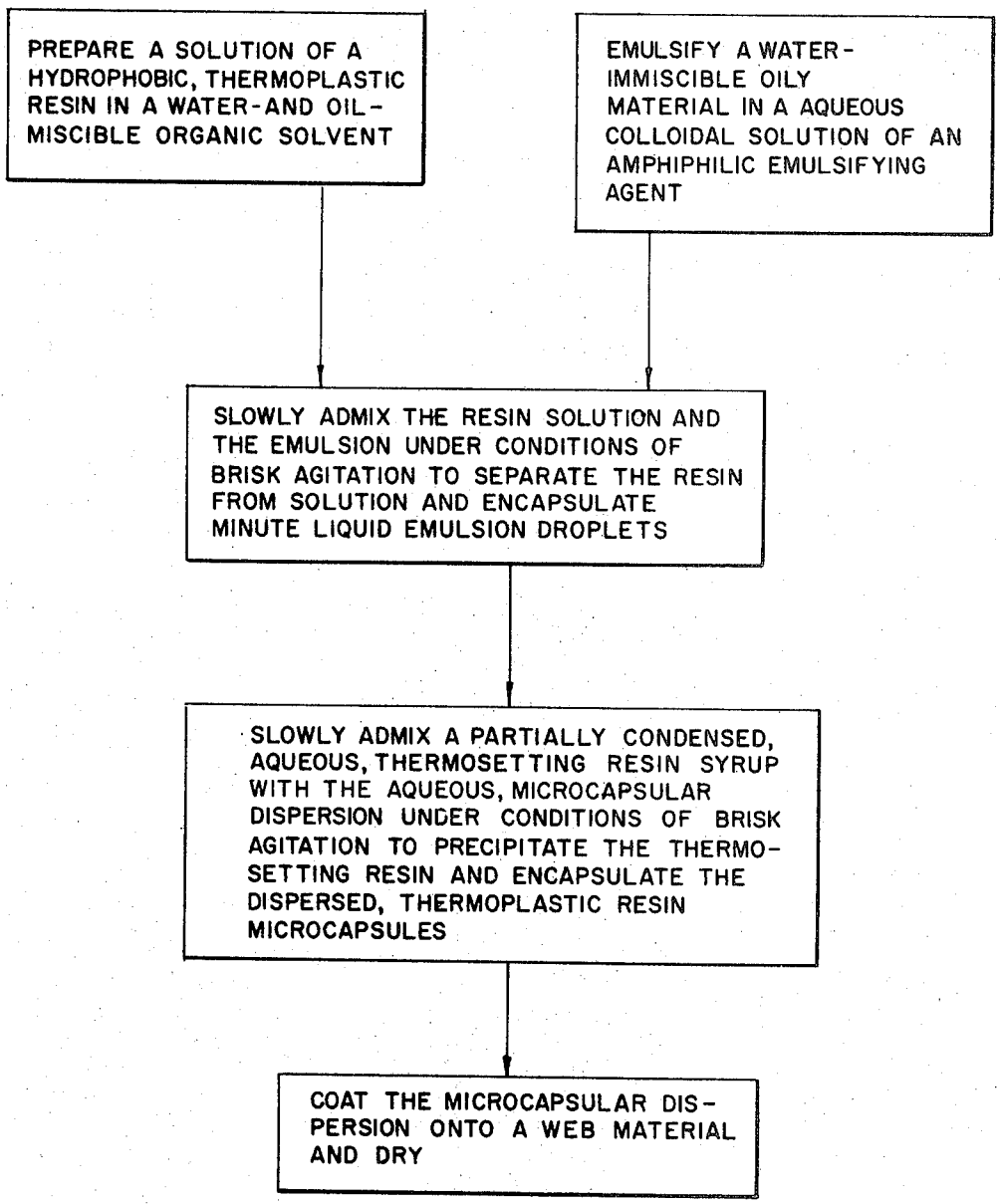

FIGS. 5, 6, and 7 illustrate three alternative processes for the microencapsulation of an oil-in-water emulsion involving both a thermoplastic and a thermosetting resin. In FIG. 5, a process is shown which may be considered a modification of the process shown in FIG. 4. More specifically, the sequence of admixing in the FIG. 5 process is identical to that of FIG. 4, except that a solution of a thermoplastic resin in a water- and oil-miscible solvent is added to the initial emulsion prior to dilution with water. On subsequent dilution the emulsion inverts and the resins precipitate to encapsulate the emulsion droplets.

Both FIGS. 6 and 7 show the encapsulation of microcapsules wherein the initial microencapsulation of the oil-in-water emulsions takes the form of the processes shown in FIGS. 4 and 2, respectively. Thus, in the process of FIG. 6, a thermoplastic resin solution is admixed with the aqueous dispersion of thermosetting resin microcapsules produced according to the process of FIG. 4. The water which is present in the dispersion effects a dilution of the thermoplastic resin solution, which dilution induces the precipitation of the thermoplastic resin. Essentially all of the previously formed thermosetting resin microcapsules are, thereby, encapsulated by the newly precipitated thermoplastic resin. In addition, some of the residual emulsifying agent in the dispersion medium is caused to be entrapped within the thermoplastic resin microcapsules.

Similarly, in the process of FIG. 7, a partially condensed, aqueous, thermosetting resin syrup is admixed with the aqueous dispersion of thermoplastic resin microcapsules produced according to the process of FIG. 2 The water in the dispersion causes the precipitation of the thermosetting resin, thus, encapsulating the dispersed, thermoplastic resin microcapsules.

The substrate employed in the present invention may be either a fibrous substrate, such as paper, a non-fibrous substrate, such as a film or a surface finish, such as paint. However, the microcapsules, such as those produced by the herein disclosed processes are also capable of being coated onto other fibrous substrates, such as plastic and fabric or textile webs.

Generally, there is sufficient residual emulsifying agent remaining in the microcapsular dispersion after separation of the resin and encapsulation of the emulsion that no additional binding agent need be used if the capsules are to be applied to a fibrous substrate. Materials such as gelatin and gum arabic have been used conventionally as binding agents. However, it is preferable to add an additional binder such as hydroxyethyl cellulose, methyl cellulose or starch to the system.

According to another aspect of the present invention, the oil-containing precursor microcapsules are preferably provided by a process which includes forming a primary oil-in-water emulsion, which emulsion comprises the water-immiscible oily material previously described. The oily material is dispersed in the form of microscopic droplets in a colloidal solution of one or more emulsifying agents. At least one of the said emulsifying agents must possess groups capable of reacting with a cross-linking or complexing agent to form a capsule wall around said dispersed microscopic droplet. The cross-linking or complexing agent is slowly added to the emulsion with brisk agitation, and this is continued until the final microcapsules are formed having substantially continuous solid walls, as hereinabove defined. The emulsion containing the precursor microcapsules may be heated to produce the opacifiers or may be directly coated onto a web material as previously described. Alternatively, the microcapsules may be separated from the emulsion by physical means, such as filtration, centrifugation, or spray drying. Subsequently, the microcapsules may be redispersed in a solution of a binder and coated onto a web material or may be dispersed in a non-fibrous substrate.

The encapsulating material of this aspect may also be an emulsifying agent which is self-complexing or self-cross-linking. In such a case the addition of a different cross-linking or complexing agent is unnecessary. Exemplary of emulsifying agents having the aforesaid characteristics which permit their employment are: naturally-occurring colloids including gums, proteins and polysaccharides, such as gum tragacanth, guar gums and gelatin; and synthetic materials such as polyvinyl alcohol and copolymers of methyl vinyl ether and maleic anhydride. Suitable copolymers of methyl vinyl ether and maleic anhydride are commercially available from the General Aniline and Film Corporation and are sold under the trademark "Gantrez". These water-soluble copolymers have the general structure

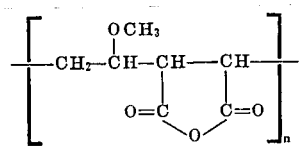

The above list comprises both gellable and non-gellable emulsifying agents, e.g. gelatin and polyvinyl alcohol. Emulsifying agents which are self cross-linking or self-complexing include certain derivatives of guar gum, such as those which are commercial available from Stein, Hall and Company sold under the trademark "Jaguar". These materials are natural hydrophilic colloids that are produced by the extraction of guar gum from the endosperm portion of eyamopsis tetragonalobus seeds and are comprised of a straight chain galacto mannan polysaccharide made of many manose and galactose units linked together.

The cross-linking or complexing agents employed with the aforesaid emulsifying agents are selected from three broad categories: (1) monomeric organic compounds, such as the aldehydes, e.g. formaldehyde, glyoxal and other formaldehyde donors, trioxane ethanolamine, and ethylene diamine; (2) ordinary inorganic compounds, such as sodium borate and boric acid; and (3) macromolecular species, such as gelatin, gum tragacanth, and methylcellulose.

While some of the cross-linking or complexing agents are suitable for use with a plurality of emulsifying agents, others are not. Thus, the preferred cross-linking or complexing agent-emulsifying agent pairs include: (1) gelatin with an aldehyde, such as formaldehyde; (2) polyvinyl alcohol with sodium borate; (3) copolymers of methyl vinyl ether and maleic anhydride with any one of gelatin, gum tragacanth, ethanolamine, ethylene diamine, polyvinyl alcohol; (4) guar gum derivatives with any one of sodium borate or methylcellulose; and (5) self-complexing guar gum derivatives with themselves.

The cross-linking or complexing agent is utilized in amounts sufficient to result in the formation of microcapsules. The relative amounts vary with the particular system, and may be easily determined in each case.

Figure 9:
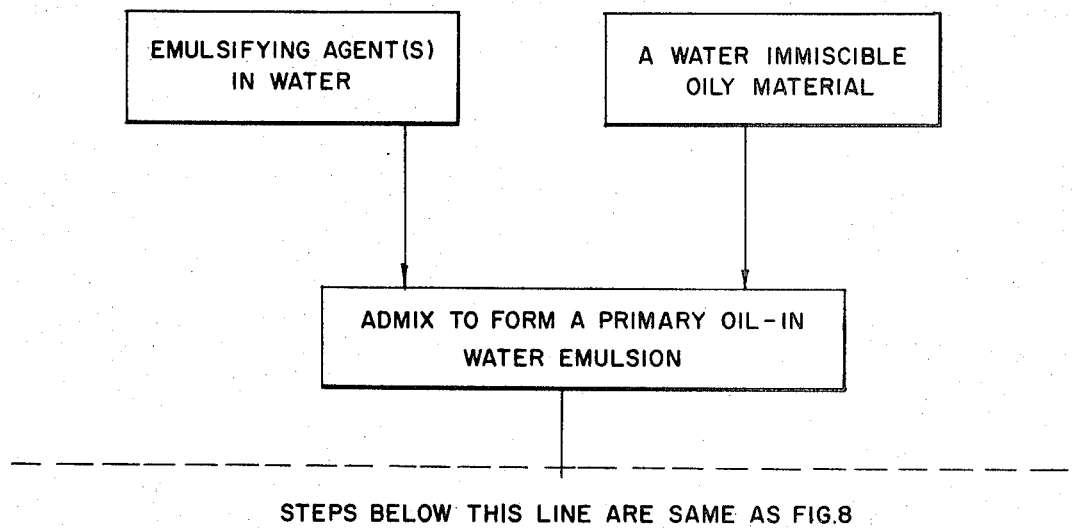
Figure 8:
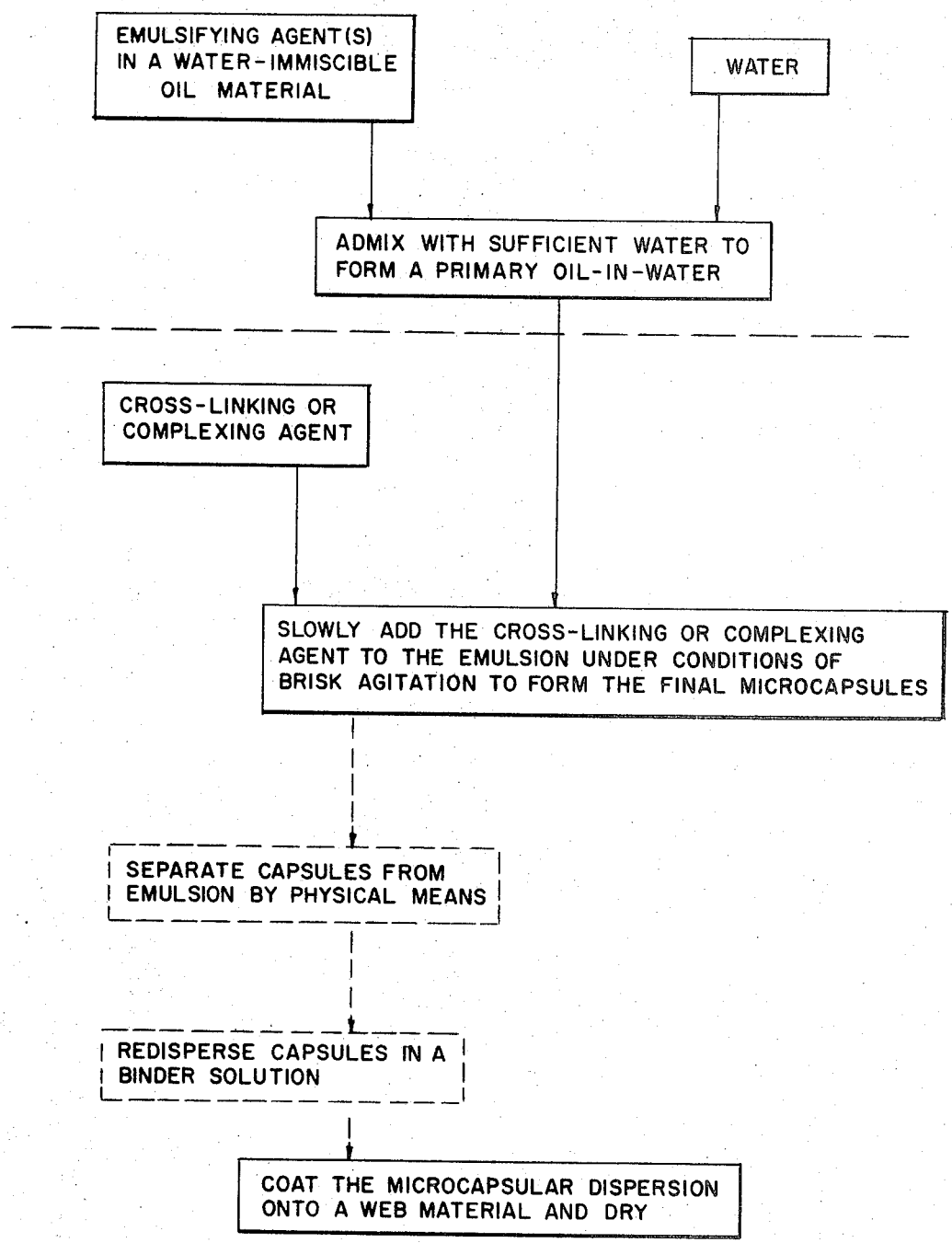

FIGS. 8 and 9 of the attached drawings illustrate processes for the provision of microcapsules according to the second aspect of the invention. In the process shown in the flow sheet of FIG. 8, a primary oil-in-water emulsion is prepared by dissolving the emulsifying agent or combination of agents in the oily material and subsequently adding water to emulsify.

The water may be added to the emulsifying agent-oil mixture either quickly or slowly with agitation. If the water is added slowly to the oil phase containing the emulsifying agent or agents, a water-in-oil emulsion is formed, which eventually is inverted to an oil-in-water emulsion with the further addition of water. Such an inversion step results in a more stable emulsion with some systems, e.g., a methyl cellulose-guar gum derivative system.

The temperature of emulsification may be varied over a broad range. However, the temperature must be kept above the gelling point of the emulsifying agent or agents only if a gelable emulsifying agent is used. Therefore, when a non-gelable emulsifying agent is used, e.g., polyvinyl alcohol, the temperature during emulsification can be varied appreciably without altering the final desired results.

Subsequent to the emulsification process, the cross-linking or complexing agent is added to the oil-in-water emulsion, slowly, and with brisk agitation to form the precursor microcapsules. Agitation may be achieved by means of a high speed mixer or impeller, by ultrasonic waves or by other conventional means so long as microcapsules having a particle size below one micron are formed.

If the emulsifying agent is of the self-complexing variety, e.g., a self-complexing guar gum derivative, the cross-linking or complexing agent comprises the same material as the emulsifying agent.

Alternatively, the emulsion containing the microcapsules may be either coated directly onto a web material and dried or the microcapsules may be separated from the emulsion by some physical means such as filtration, spray drying centrifugation; redispersed in a solution of a binder; coated onto a web material and dried. Removal of the oil from the interior of the capsule may be done either before or after coating, as before. Suitable binders include methyl cellulose, starch, casein, polyvinyl alcohol, synthetic latex, and styrene-butadiene rubber. Alternatively, materials such as urea-formaldehyde or melamine-formaldehyde condensates may be employed.

In the encapsulation process illustrated in FIG. 9, the oil-in-water emulsion is prepared by dissolving the emulsifying agent (or agents) in water and subsequently adding the oily material to the water solution with agitation until complete emulsification has occurred. The emulsion may then be diluted with water to give the desired viscosity suitable for coating. Capsule diameters suitable for producing the microcapsular opacifiers of the present invention, i.e., in the range below one micron, are likewise obtainable by the process of FIG. 8 by adding cross-linking or complexing agents with agitation as previously described.

Figure 10:
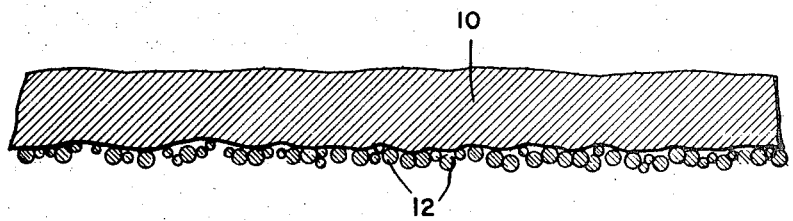

FIG. 10 represents a cross-sectional view of a portion of a fibrous substrate produced according to the practices of the present invention wherein a paper web material 10 contains a substantially uniform coating of opacifiers 12 having an average diameter below about one micron and containing air as the core material. The binding agent employed to secure the opacifiers to the paper web is not shown.

The production of the precursor microcapsule as hereinabove described is disclosed in copending applications Ser. No. 503,391, filed on Oct. 23, 1965, now U.S. Pat. No. 3,418,656, and Ser. No. 583,046, filed Sept. 23, 1966, the disclosures of which are hereby incorporated by reference.

The following examples illustrate the production of air-containing microcapsular opacifiers and constitute the best modes contemplated for carrying out the present invention. The ream of paper as employed in the following examples and claims com-prises 500 sheets of 25 inch by 38 inch paper or a total of 3300 square feet of paper. Likewise, the paper employed in the following examples is bond paper (32.5 pounds per ream) having a TAPPI opacity of 69 percent points prior to coating.

EXAMPLE 1

One hundred grams of styrene (monomer) are emulsified with 370 grams of a 7.5 percent by weight methyl cellulose (25 centipoises) solution in water in a Waring blender. Emulsification is continued until the average particle diameter of the emulsion droplets is about 0.5 microns. Subsequently, 20 grams of an aqueous B-stage urea-formaldehyde condensate (65 percent by weight solids) are slowly added to the emulsion with continued agitation in order to induce encapsulation.

The oil-containing microcapsules are coated onto a web comprising bond paper. The bond paper is coated with 11.5 pounds per ream of the oil-containing precursor microcapsules. The paper web is dried at a temperature of about 85°C., for a period of time sufficient to remove the styrene monomer and result in the air-containing microcapsules. These microcapsules have an unexpectedly high TAPPI opacity of 86.5 percent points, while at the same time the weight of the paper web is only increased to the extent of 3.6 pounds per ream of paper.

EXAMPLE 2

The method of Example 1 is repeated employing 100 grams of a chlorinated biphenyl oil (Aroclor 1221) instead of styrene and this material is emulsified with 720 grams of a 4 percent by weight gelatin solution under conditions of brisk agitation. The microcapsules have the same diameter as the previous example. To avoid gelation, the emulsification is performed at a temperature of 60°C.

The oil-containing microcapsules are coated onto the bond paper of the previous Example and are dried at a temperature of 85°C. A resulting coat weight of 4.5 pounds per ream of air-containing microcapsules on the bond paper is thereby provided. The air-containing microcapsules produce a final TAPPI opacity of 89.6 percent points, which constitutes a 20.6 percent points increase over the initial TAPPI opacity of the uncoated bond paper, viz., 69 percent points.

EXAMPLE 3

The emulsion procedure of Example 2 is repeated, with the exception that 200 grams of a 15 percent by weight gum arabic solution is employed at room temperature in place of the gelatin solution.

A coat weight of 6.8 pounds of the air-containing microcapsules per ream of the bond paper results in a final TAPPI opacity of 92 percent. This constitutes an increase of 23 percent points TAPPI opacity over that of the original paper.

EXAMPLE 4

The procedure of Example 3 is repeated utilizing 365.8 grams of an 8.5 percent solution of methyl cellulose (15 centipoises viscosity) as the emulsifying agent in place of gum arabic. The microcapsules containing the chlorinated biphenyl oil have an average diameter below 1 micron and are coated onto the bond paper as before and are dried at a temperature of about 85°C., which is sufficient to drive off the chlorinated biphenyl. The resulting coat weight of the aircontaining microcapsules is 2.3 pounds of microcapsules per ream of the paper. A measurement of the TAPPI opacity of the coated paper indicates an increase of 13.6 percent points in TAPPI opacity over the original paper for a value of 82.6 percent points.

EXAMPLES 5-11

For comparative purposes, the bond paper employed in the previous examples is coated with titanium dioxide in various coat weights. The resulting TAPPI opacity is then measured for each respective weight.

| Example No. | Coat-Weight (lbs./ream) | TAPPI Opacity (%) |
|---|---|---|
| 5 | 3.2 | 84 |
| 6 | 4.5 | 86.5 |
| 7 | 5.7 | 88.7 |
| 8 | 6.4 | 91 |
| 9 | 8.4 | 92.2 |
| 10 | 9.7 | 93.3 |
| 11 | 11.9 | 94.4 |

As seen from the foregoing comparative Examples, a substantially higher coat-weight of the inorganic pigment, viz., titanium dioxide, is required to give the same opacities as the air-containing microcapsules. For example, a coat weight of 4.5 pounds of titanium dioxide per ream of bond paper, as shown in Example 6, is required to give the 86.5 percent points TAPPI opacity that is achieved in Example 1 with the employment of only 3.6 pounds per ream of the air-containing microcapsular opacifiers. Likewise, a coat weight of 8.4 pounds of the titanium dioxide per ream of paper is required to give a TAPPI opacity of about 92 percent points (see Example 9), while only 6.8 pounds per ream of the air-containing microcapsules resulted in a final TAPPI opacity of 92 percent points (see Example 3, above).

EXAMPLE 12

A primary oil-in-water emulsion is formed by adding 50 milliliters of chlorinated biphenyl oil to 10 grams of a purified gelating which is dissolved in 100 grams of water at a temperature of about 50°C. over a period of 20 to 30 minutes. Subsequently, 100 milliliters of 1M formaldehyde solution in water are slowly added to the emulsion with brisk agitation followed by the addition of 50 milliliters of water. The addition of the formaldehyde results in the formation of welldefined microcapsules having a particle size of 1.0 micron.

The microcapsules are then filtered, washed with successive 50 milliliter portions of water, methanol and formalin solution, and redispersed in 100 milliliters of water containing 4 grams of a binding agent comprising methyl cellulose. The solution of methyl cellulose containing the microcapsules is coated onto a paper web and dried at 85°C. to drive off the oil.

EXAMPLE 13

One hundred grams of water containing 5 grams of methyl cellulose are emulsified with 25 grams of chlorinated biphenyl. Ten grams of Gantrez-39 (a copolymer of methyl vinyl ether and maleic anhydride) are added to the emulsion and emulsification is allowed to proceed for an additional 10 to 15 minutes. Subsequently, 10 milliliters of ethylene diamine are slowly added with brisk agitation, resulting in the formation of well-defined microcapsules having an average diameter of 0.9 micron. The viscosity of the above emulsion, containing the microcapsules is further regulated with additional water (between 50 and 60 milliliters of water). Next, the dispersion is heated to 80°C. after being coated onto a paper web in order to produce the opacifiers. The coated paper web is subsequently dried and has a highly opaque surface.

EXAMPLE 14

An emulsion is prepared by adding 200 grams of mineral spirits (Phillips 66 soltrol 130) in a Waring blender and emulsifying it with 365 grams of an 8.2 percent by weight methylcellulose (15 cps) solution in water using brisk agitation. Emulsification is continued until the average diameter of the emulsion droplets is about 0.8 microns. Subsequently, 90 grams of a B-stage urea-formaldehyde (65 percent solids by weight solution in water) resin are added; this is followed by the slow addition of 40 milliliters of a 15 percent by weight citric acid solution in water. The microcapsules are then coated onto paper, and the coated paper is dried in an oven at 85°C. for 15 minutes. The resulting coat weight (after the evolution of the mineral spirits from the microcapsules) is 5.68 lbs. per ream and the corresponding increase in TAPPI opacity is 16.4 percent points.

EXAMPLE 15

One hundred-fifty grams of mineral spirits are emulsified with 365 grams of a 20 percent by weight polyvinyl alcohol (duPont's Elvanol 52-22) solution in water. Emulsification is continued until the average diameter of the emulsion droplets is about 1 micron. Subsequently, 90 grams of urea-formaldehyde solution are added. The microcapsules are coated onto paper, and the coated paper is dried in an oven at 85°C. for 15 minutes. The resulting coat weight (after the evolution of the mineral spirits from the microcapsules) is 4.0 lbs. per ream and the corresponding increase in TAPPI opacity is 10 percent points.

EXAMPLE 16

Mineral spirits in the amount of 150 grams are emulsified with 300 grams of a 13 percent by weight styrene-maleic anhydride solution in water. Emulsification is continued until the average diameter of the emulsion droplets is about 1 micron. Subsequently, 90 grams of a B-stage urea-formaldehyde (65 percent solids by weight solution in water) resin are added and the microcapsules coated onto paper. The coated paper is dried in an oven at 85°C. for 15 minutes. The resulting coat weight (after the evolution of the mineral spirits from the microcapsules) is 6.22 lbs. per ream and the corresponding increase in TAPPI opacity is 17.3 percent points.

EXAMPLE 17

One hundred-fifty grams of xylene are emulsified with 365 grams of 8.2 percent by weight methylcellulose solution in water. Emulsification is continued until the average diameter of the emulsion droplets is about 1 micron. Subsequently, 60 grams of a B-stage urea-formaldehyde resin are added and the microcapsules coated onto paper. The coated paper is dried in an oven at 85°C. for 15 minutes. The resulting coat weight (after the evolution of the xylene from the microcapsules) is 5.92 lbs. per ream and the corresponding increase in TAPPI opacity is 15 percent points.

EXAMPLE 18

One hundred grams of a chlorinated biphenyl (Aroclor 1221) are emulsified with 365 grams of an 8.2 percent by weight methyl-cellulose solution in water. Emulsification is continued until the average diameter of the emulsion droplets is about 0.8 micron. Subsequently, 60 grams of a B-stage melamine-formaldehyde resin is added and the microcapsules are coated onto paper. The coated paper is dried in an oven 85°C. for 1 hour. The resulting coat weight (after the evolution of the chlorinated biphenyl from the microcapsules) is 5.16 lbs. per ream and the corresponding increase in TAPPI opacity was 15 percent points.

EXAMPLE 19

Seventy-five grams of mineral spirits are emulsified with 90 grams of a 9.1 percent starch solution and 90 grams of an 8.2 percent by weight methylcellulose solution in water. Emulsification is continued until the average diameter of the emulsion droplets is about 0.7 microns. Subsequently, 45 grams of a urea-formaldehyde resin is added and the microcapsules are coated onto paper. The coated paper is dried in an oven at 85°C. for 15 minutes. The resulting coat weight (after the evolution of the mineral spirits from the microcapsules) is 5.2 lbs. per ream and the corresponding increase in TAPPI opacity is 12 percent points.

EXAMPLE 20

A chlorinated biphenyl (Aroclor 1221) in the amount of 100 grams are emulsified with 200 grams of a 15 percent gum arabic solution. Emulsification is continued until the average diameter of the emulsion droplets is about 1.7 microns. Subsequently, 20 grams of a B-stage urea-formaldehyde resin and 5 grams of glyoxal are added and the microcapsules are cured for 4 hours at 80°C. The microcapsules are then coated onto paper, and the paper is dried in an oven at 80°C. for 1 hour. The resulting coat weight (after the evolution of the chlorinated biphenyl from the microcapsules) is 4.9 lbs. per ream and the corresponding increase in TAPPI opacity is 19 percent points.

EXAMPLE 21

Sixty grams of low density (0.92) polyethylene are melted in a high shear heated mixer at 130°C., 40 grams of dry, air-filled microcapsules (of approximately 1 micron average diameter) are added to the molten polyethylene and mixing is continued until a good dispersion is obtained. When a film of 5 mil thickness is compression molded at 325°F. and 2,000 psi pressure, the TAPPI opacity of the resulting film is 65 percent points. A similar polyethylene film of comparable thickness is substantially transparent.

EXAMPLE 22

Two hundred grams of mineral spirits are emulsified with 365 grams of an 8.2 percent (by weight) methylcellulose solution in water. Emulsification is continued until the average diameter of the emulsion droplet is about 1 micron. Subsequently, 120 grams of a B-stage urea-formaldehyde resin, 1 gram of citric acid and 10 grams of a styrene butadiene latex (40–50 percent total solids) are added to the emulsion. When a thin coat of the above mixture is applied on a 6 ×6 ×¼ inch piece of wood and air dried, a white opaque coating, with excellent hiding power is obtained.

EXAMPLE 23

Seventy-five grams of mineral spirits are emulsified with 182.5 grams of an 8.2 percent (by weight) methylcellulose solution in water. Subsequently, 70 grams of a 40 percent (by weight) solution of a phenoxy resin comprising the condensation product of bisphenol-A and epichlorohydrin (Union Carbide's PKHH resin) in methyl ethyl ketone are added slowly and with brisk agitation. Mixing is continued until microcapsules having an average diameter of about 0.7 micron are obtained. The solution containing the microcapsules is coated onto paper and dried in an oven at 85°C. for 20 minutes to remove the mineral spirits from the microcapsules. A coat weight of 3.84 lbs. per ream of the aircontaining microcapsules result in an increase in the TAPPI opacity of the paper of 9 percent points.

EXAMPLE 24

Using the British standard sheet mold, handsheets are prepared corresponding to a basis ream weight of 48 pounds per 3,300 square feet from a furnish consisting of 75 percent bleached sulfate pulp from mixed southern hardwoods and 25 percent bleached southern pine sulfate pulp. Similar handsheets corresponding to the same final basis weight are prepared by adding approximately 10 percent (by weight of the fiber furnish) of air-containing microcapsules. An increase of about 7 to 8 percent points in opacity is obtained with the sheet containing the air microcapsules.

EXAMPLE 25

Example 14 is exactly duplicated with the only difference being that prior to coating the air-containing microcapsules onto the paper web, 6 grams of $TiO_2$ are added to the capsule-containing solution. The resulting admixture is coated onto paper and dried in an oven at 85°C. for 15 minutes. The resulting coat weight (after the evolution of the mineral spirits from the microcapsules) is 5.0 lbs. per ream and the corresponding increase in TAPPI opacity is 19.4 percent points.

The opacifiers of the present invention may be employed in all known applications where conventional pigments have been used for inducing or increasing opacity. For example, the opacifiers may be used in paint, as inks, in plastics, on metals, glass, wood, plaster, in films, on fabrics, paper and the like.

Although the invention has been described in considerable detail with particular reference to certain preferred embodiments thereof, variations and modifications can be effected within the spirit and scope of the invention as described hereinbefore, and as defined in the appended claims.

What is claimed is:

1. A method for producing a highly opaque, fibrous substrate which comprises providing a dispersion of fibers and discrete, substantially spherical, microcapsules having substantially continuous, organic, polymeric, solid walls, said microcapsules having an average particle diameter of below about 1 micron and containing a core material, forming said dispersion into a fibrous substrate, and heating said substrate to a temperature sufficient to substantially completely drive off said core material from said microcapsules, and replace said core with air, said air-containing microcapsules being capable of increasing the TAPPI opacity of a ream of bond paper having a TAPPI opacity of 69 percent points without said air-containing microcapsules, by at least 9 percent points when said paper is provided with 3.84 pounds per ream of said air-containing microcapsules.

2. The method of claim 1 wherein said fibers are cellulosic.

3. The method of claim 1 wherein said core material is a water-immiscible material.

4. The method of claim 3 wherein said water-immiscible material is an oily material selected from the group consisting of liquid and low melting oil, fats and waxes.

5. The method of claim 1 wherein said core material is a water-miscible material.

6. A fibrous substrate, containing discrete, substantially spherical, air-containing microcapsules having substantially continuous, organic, polymeric, solid walls, said microcapsules having an average particle diameter of below about 1 micron, said air-containing microcapsules being capable of increasing the TAPPI opacity of a ream of bond paper having a TAPPI opacity of 69 percent points without said air-containing microcapsules, by at least 9 percent points when said paper is provided with 3.84 pounds per ream of said air-containing microcapsules.

* * * * *